United States Patent
Jaramillo, III et al.

(10) Patent No.: US 10,372,304 B2
(45) Date of Patent: Aug. 6, 2019

(54) FACILITATING OBJECT SET REPLICATION

(71) Applicant: ADOBE INC., San Jose, CA (US)

(72) Inventors: Narciso Batacan Jaramillo, III, Piedmont, CA (US); Tomas Krcha, San Francisco, CA (US); Anirudh Sasikumar, Foster City, CA (US); Talin Chris Wadsworth, Castro Valley, CA (US)

(73) Assignee: ADOBE INC., San Jose, CA (US)

( * ) Notice: Subject to any disclaimer, the term of this patent is extended or adjusted under 35 U.S.C. 154(b) by 14 days.

(21) Appl. No.: 15/016,062

(22) Filed: Feb. 4, 2016

(65) Prior Publication Data

US 2016/0342296 A1    Nov. 24, 2016

Related U.S. Application Data

(63) Continuation of application No. 14/719,177, filed on May 21, 2015, now Pat. No. 10,037,131.

(51) Int. Cl.
| | | |
|---|---|---|
| *G06F 3/0484* | (2013.01) | |
| *G06F 17/21* | (2006.01) | |
| *G06F 3/0482* | (2013.01) | |
| *G06F 3/0481* | (2013.01) | |
| *G06F 17/24* | (2006.01) | |

(52) U.S. Cl.
CPC .......... *G06F 3/0484* (2013.01); *G06F 3/0481* (2013.01); *G06F 3/0482* (2013.01); *G06F 3/04817* (2013.01); *G06F 17/211* (2013.01); *G06F 17/245* (2013.01)

(58) Field of Classification Search
None
See application file for complete search history.

(56) References Cited

U.S. PATENT DOCUMENTS

| | | |
|---|---|---|
| 2004/0109137 A1 | 6/2004 | Bubie et al. |
| 2005/0237321 A1 | 10/2005 | Young et al. |
| 2015/0089420 A1 | 3/2015 | Murata et al. |

OTHER PUBLICATIONS

Roskes, Bonnie, "Google SketchUp Cookbook", Mar. 30, 2009, O'Reilly Media, Chapters 1 and 7.*

(Continued)

*Primary Examiner* — Stella Higgs
(74) *Attorney, Agent, or Firm* — Shook, Hardy & Bacon L.L.P.

(57) ABSTRACT

Embodiments of the present invention provide systems, methods, and computer storage media directed to facilitating object set replication. In embodiments described herein, a repeatable object set can be generated. Such a repeatable object set can include one or more objects and a field format indicating a position of the object(s) within a field. The generated repeatable object set can be replicated as replicated object sets into a set of fields within a layout structure, wherein each of the replicated object sets includes a representation of the object(s) placed within a corresponding field in accordance with the field format indicating the position of the one or more objects. The replicated object sets within the set of fields the layout structure can then be presented.

11 Claims, 11 Drawing Sheets

(56) References Cited

OTHER PUBLICATIONS

Designmodo, "How to Transform and Duplicate Objects in Adobe Illustrator", [online] Feb. 2013, retrieved from the internet:<URL: http://designmodo.com/transform-duplicate-objects-illustrator/>.*

Fane, B. et al., "AutoCAD 2014 for Dummies", John Wiley and Sons Inc., 2013, chapter 18.* video-tutorials.net, "Creating rectangular arrays (linear patterns) AutoCAD tutorials", [online], 2013, retrieved from internet: <https://www.youtube.com/watch?v=WVtthi4d6ls>.*

Frye, C., "Microsoft Excel 2013 Plain & Simple", Apr. 2013, Microsoft Press, Chapter 7 (Year: 2013).*

Citation of Link to Video Available Online: "Articles" Feature, Professional Design Tools, Webydo.com, copyright 2010-2015, Webydo. Available at: http://www.webydo.com/features.html Last accessed Dec. 3, 2015.

Preinterview First Office Action dated Jan. 19, 2017 in U.S. Appl. No. 14/719,177, 22 pages.

First Action Interview Office Action dated Apr. 20, 2017 in U.S. Appl. No. 14/719,177, 13 pages.

Green, R. "Associative Arrays—Editing Source Objects", [online], 2011, retrieved from the internet: <https://www.youtube.com/watch?v=SZhSrBiiN_8>.

Final Office Action dated Oct. 12, 2017 in U.S. Appl. No. 14/719,177, 21 pages.

Notice of Allowance dated Apr. 26, 2018 in U.S. Appl. No. 14/719,177. 12 pages.

\* cited by examiner

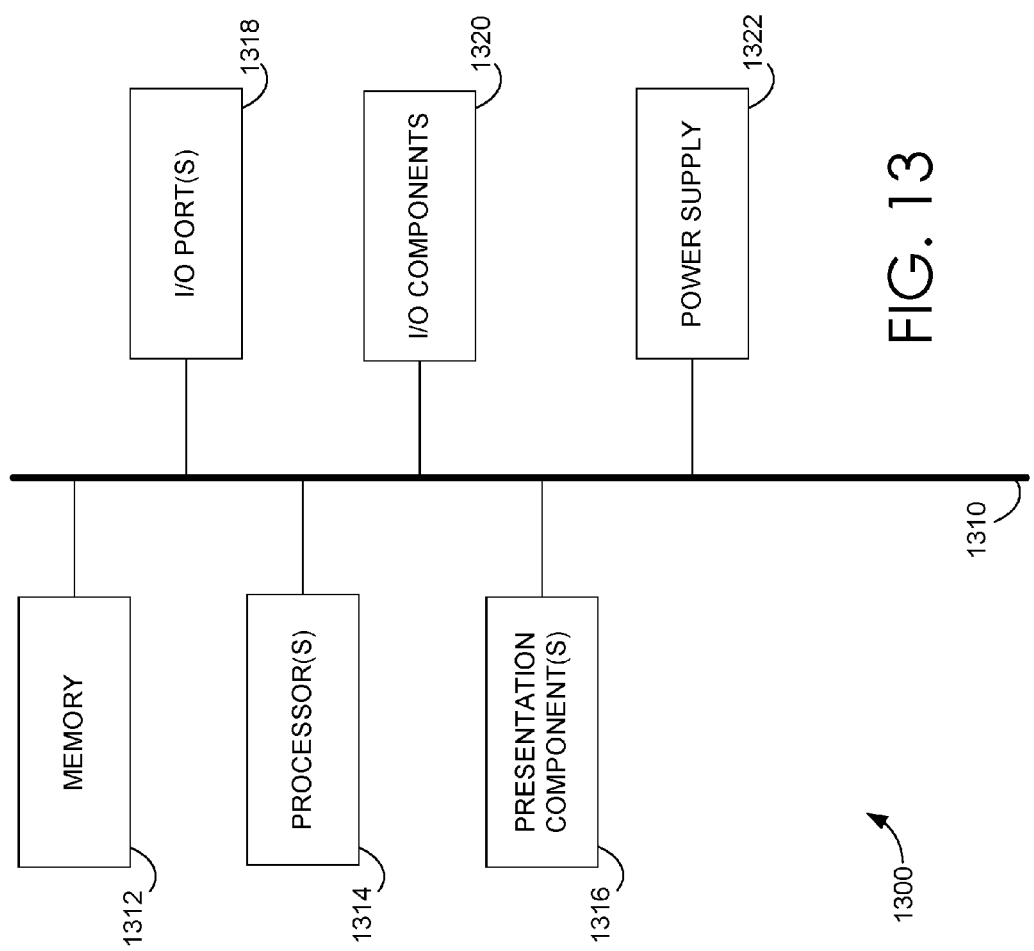

FACILITATING OBJECT SET REPLICATION

CROSS-REFERENCE TO RELATED APPLICATIONS

This application is a continuation of U.S. patent application Ser. No. 14/719,177, filed May 21, 2015, entitled "Facilitating Object Set Replication," the benefit of priority of which is hereby claimed, and which is incorporated by reference herein in its entirety.

BACKGROUND

Some visual screen design technologies have been developed that provide mechanisms for users to generate new graphical user interface designs, for instance, for mobile applications. Users creating visual designs for screen-based output (e.g., web sites, web applications and mobile applications) often need to design areas within a screen display that contain repeated fields (e.g., including content and/or formatting) arranged in a list or grid format. For example, a contact list view in a mobile application might include a list, where each row in the list contains an avatar photo, text fields for name and job title, and a chevron icon for navigation to a detail screen.

In order to design these types of repeated fields, users must replicate an object or set of objects within a field, including format and/or content, multiple times. Typically, users perform such a replication by drawing one example of an object and, thereafter, copying and pasting the object as desired. After multiple objects have been pasted, the object copies are repositioned so as to match the list layout. Not only is the initial structuring of the visual design tedious using this replication process, but experimenting with different layouts and editing the object content and/or format can also be difficult and time consuming. For instance, experimenting with different amounts of spacing between objects, different styles for the text objects, different shapes for an avatar photo, or different spacing between rows and/or columns can be tedious because any change to one aspect must be manually made to all the other aspects.

SUMMARY

Embodiments of the present invention relate to facilitating object set replication. In this regard, an object set containing one or more objects can be efficiently replicated across various fields of a layout structure (e.g., grid) while maintaining layout or positioning of the objects within each field. As such, a user is not required to manually reconfigure the positioning of objects within each field separately. Further, modifications made to one object set can be automatically applied across multiple object sets to enable modifications to be efficiently made, for instance, such that a designer can easily experiment with different layouts or configurations associated with object sets and/or a layout structure.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 13 is a block diagram of an exemplary computing environment suitable for use in implementing embodiments of the present invention.

DETAILED DESCRIPTION

Figure 1:
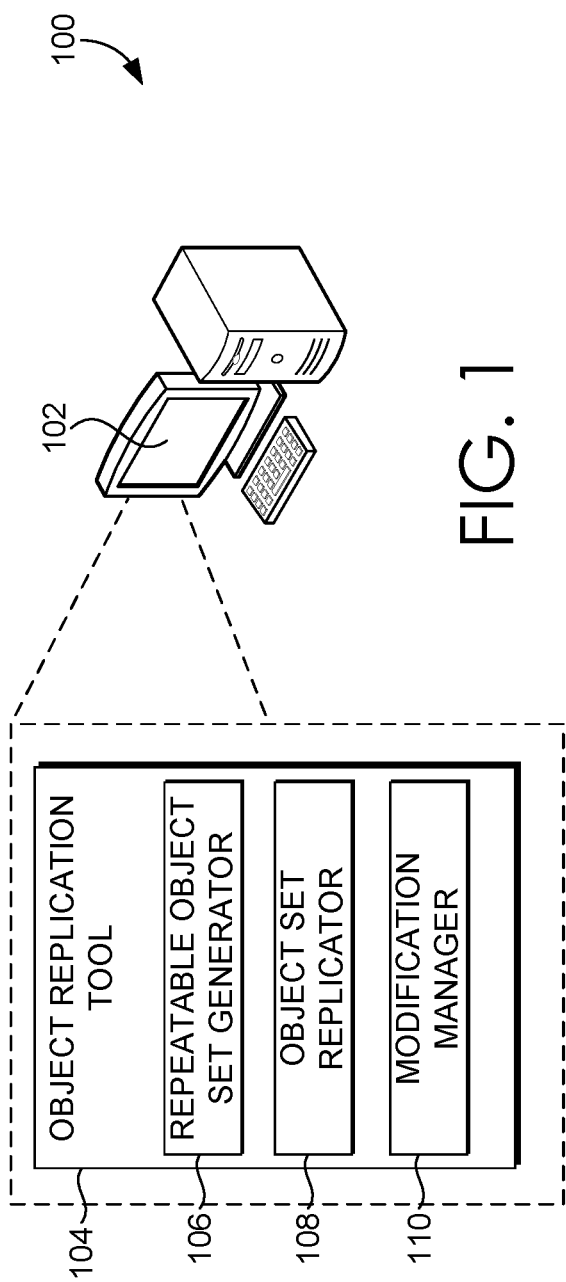
FIG. 1 illustrates an exemplary computing device that is utilized to facilitate object set replication, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, graphical user interface designers replicate items in connection with a visual design for a screen-based output, such as a web site, a web application, or a mobile application. For instance, a view in a mobile application might include resources that are structured in a similar format. As such, some graphical user interface tools exist that enable a user to replicate items within a visual area. For example, to assist in the replication of items, some tools allow a user to create content once and then replicate the item into multiple instances. With such conventional tools, however, a user must manually position the items relative to one another. Further, changes to the layout of one item does not affect the layout of another item. Even with tools that allow a user to select a particular item for replicating into a grid of copies that then can be edited, modifications to one item are not efficiently replicated to other items.

Embodiments of the present invention are directed to facilitating replication of repeatable object sets. A repeatable object set refers to a set of one or more objects that are generally presented as a group and can be repeated within a visual display, such as within various fields within a layout structure (e.g., a grid or table). An object can be any type of object or item, such as a text object, an image object, a multimedia object, or the like. By way of example, a repeatable object set might be an icon and corresponding title. As described herein, a repeatable object set can be efficiently replicated in various fields within a layout structure. An example of a commonly used layout structure is a grid or table designed to have multiple columns and/or rows of fields or cells.

As such, embodiments described herein facilitate replicating a repeatable object set into various fields within a grid presented for visual display. In implementation, upon generation of a desired repeatable object set, the repeatable object set can be efficiently replicated in various fields within a designated layout structure. In some cases, a repeatable object set can also include a field format that indicates a placement, arrangement, or layout between objects within the object set and/or within a field. In this regard, the field format associated with the repeatable object set can also be replicated within various fields along with the replication of the object(s). Enabling a repeatable object set including field format associated therewith to be easily replicated enables a designer to efficiently design a layout structure, such as a grid, within a graphical user interface, without necessitating multiple copy and paste operations and/or repositioning of objects within fields.

Further, various implementations enable efficient modifications to a repeatable object set and/or the layout structure. In this regard, upon a modification to a repeatable object set, the modification can be automatically applied to each of the replicated object sets such that a user is not required to modify each replicated object set independently. For example, a user may modify object text, text formatting, an object image, placement of an object within a field, remove an object from the object set, add an object to the object set, etc. Upon modifying an aspect of a repeatable object set, other replicated object sets are automatically updated to include such a modification(s). As can be appreciated, embodiments of the present invention enable defaults regarding modifications to be replicated. As one example, style and layout edits are replicated while content edits are not replicated.

Modifications to a layout structure can also be applied to efficiently design a layout structure. A user can modify a layout structure in any number of ways including, for example, modifying the number of fields (e.g., via rows or columns) of a layout structure or modifying the spacing between fields within the layout structure. Based on a layout structure modification, applicable modifications can be made to the layout structure. For example, assume that a user selects to modify the spacing or padding between two of the columns within a layout structure. In such a case, the spacing between the other columns can be automatically modified. As another example, based on a user selection to add an additional row to the layout structure (e.g., by expanding an layout container), the additional row can be automatically filled with the corresponding repeatable object sets.

Enabling modification of an object set and/or the layout structure as described herein can enable a user to efficiently make changes to a graphical user interface to quickly evaluate the modified design. As such, repetitive modifications are not required in order to view and assess design changes associated with a layout structure, or repeatable object sets therein.

Although the description provided herein is generally directed to a graphical user interface design tool, as can be appreciated, the repeatable object set tool described herein could be used in association with other types of applications or services, such as drawing applications, electronic documents, or the like. As such, in addition to a graphical user interface designing environment, the repeatable object set tool may be implemented in any number of environments including, for example, documents, spreadsheets, or the like.

In accordance with embodiments of the present invention, FIG. 1 illustrates an exemplary computing device 100 that is utilized to facilitate object set replication. The computing device 100 can be any device associated with a display screen 102, such as the computing device 1300 of FIG. 13. The display screen 102 is a screen or monitor that can visually present, display, or output information, such as, for example, drawings, sketches, images, text, figures, values, symbols, videos, video clips, movies, photographs, lists, data sets, webpages, emails, text messages, notifications, or any other content. In some embodiments, the computing device 100 is a portable or mobile device, such as a mobile phone, a personal digital assistant (PDA), a video player, a laptop, or any other portable device associated with a display screen. In some implementations, the computing device 100, such as a portable device, includes the display screen 102 (as illustrated in FIG. 1). That is, a display screen is integrated or coupled with the portable device. In other implementations, a display screen is remote from, but in communication with, the computing device.

The display screen 102 may be a touchscreen display. A touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display.

As shown in FIG. 1, the exemplary computing device 100 includes an object replication tool 104. The object replication tool 104 is generally configured to facilitate the replication of object sets. In some cases, the object replication tool 104 is part of an application that performs the replication functionality. For example, the object replication tool 104 might perform replication functionality within graphical user interface designing and/or editing software. In other cases, the object replication tool 104 might be distinct from an application that performs the replication functionality. In this regard, the object replication tool 104 might identify a manner in which to replicate repeatable object sets and, thereafter, communicate with an application that subsequently performs the replication functionality. Irrespective of whether the object replication tool 104 or another component performs the functionality, or portions thereof, as described herein, a user of the computing device 100 can view the design generated in accordance therewith, via the display 102.

The object replication tool 104 is generally configured to enable replication of repeatable object sets within an electronic visible design. As described in more detail below, in one implementation, upon generating a repeatable object set, the repeatable object set is replicated in accordance with a field format, for example, specified by a user. In this regard, the object replication tool 104 efficiently replicates repeatable object sets within a layout structure such that formatting within fields is consistent within the layout structure. Further, repeatable object sets, field format, and/or layout structure format can be modified to enable the user to efficiently implement modifications in a consistent manner without requiring multiple manual modifications, for instance, in accordance with each of the object sets or placement associated therewith.

A repeatable object set refers to a set of one or more objects that are generally presented as a group and can be repeated within a visual display, such as within various fields within a layout structure. An object can be any type of object or item, such as a text object, an image object, a multimedia object, a container object, or the like. An object may be defined or characterized by content, an object container, and/or a format. Content refers to the content or substance that is included as part of the object. For example, content may be a particular image, particular text (e.g., "hello"), particular video, particular icon, or the like. An object container refers to a container included in the object set that can hold any type of data or a particular type of data. For example, an object container might indicate that an object is to be an image, an email address, a name, text, or the like. That is, an object container can include attributes that define a type of data to hold within the container. In essence, an object container is similar to a place holder for a particular type of content. A format might be any format applied to an object, such as object size (e.g., text size, image size), object color (e.g., text color), object style (e.g., font style, borders, etc.). In some cases, a repeatable object set can also include a field format that indicates a placement, arrangement, or layout between objects within the object set and/or within a field. A repeatable object set and object set may be used interchangeably herein as, in some implementations, any object set can be repeated within a visual display.

At a high level, a repeatable object set and/or field format associated therewith can be replicated and/or modified in a layout structure. That is, a repeatable object set, such as an icon and corresponding title, can be efficiently replicated in various fields within a layout structure. A layout structure is used to refer to any visually presented structure having components or fields in which repeatable objects can be replicated. In embodiments, the layout structure can be modified by a user, for example, to restructure the object sets therein. An example of a commonly used layout structure is a grid or table designed to have multiple columns and/or rows of fields or cells. Other examples of a layout structure include, for instance, a path or symmetrical shape. A field refers to an area in which an object set is placed or positioned. A typical field may be rectangular in shape, but a field can be of any size and shape and is not intended to be limited to embodiments described herein. For example, fields may be a square shape, a circular shape, a polygonal shape, a free-form shape, etc.

As shown in FIG. 1, the object replication tool 104 includes a repeatable object set generator 106, an object set replicator 108, and a modification manager 110. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The repeatable object set generator 106 is configured to facilitate generation of a repeatable object set. In some cases, generation of a repeatable object set may be initiated via user selection of a generation tool. In other cases, the object set might be generated in accordance with typical drawing functionality and replicated upon selection of a tool. In this regard, a user may generate an object set via an application as typically generated and initiate the repeatable nature of the object set upon completion of generating the object set, for example, by selecting a replication icon as described below with regard to the replication component.

As previously described, a repeatable object set includes a set of one or more objects to be grouped together as a set for replication thereof. Any number of objects may be included in a repeatable object set and is not intended to be limited herein. For example, a repeatable object set may only have one object. In other cases, a repeatable object set may have several objects. An object can be any type of object or item, such as a text object, an image object, a multimedia object, a container object, or the like. An object may be defined or characterized by content, an object container, and/or a format. Content refers to the content or substance that is included as part of the object. For example, content may be a particular image, particular text, particular video, particular icon, or the like. An object container refers to a container included in the object set that can hold any type of data or a particular type of data. For example, an object container might indicate that an object is to be an image, an email address, a name, text, or the like. That is, an object container can include attributes that define a type of data to hold within the container. In essence, an object container is similar to a place holder for a particular type of content. A format might be any format applied to an object, such as object size (e.g., text size, image size), object color (e.g., text color), object style (e.g., font style, borders), etc.

In some embodiments, a repeatable object set can also include a field format that indicates a placement, arrangement, or layout between objects within the object set and/or within a field. In this way, the layout or arrangement of objects within a field can be designated and included as part of the repeatable object set. As such, in accordance with object set replication, the spatial relationship between objects within a field is consistent among fields.

Generation of the repeatable object set, or a portion thereof, can be performed in any manner and is not intended to be limited to embodiments described herein. Generally, a repeatable object set, or portion thereof (e.g., an object), is generated based on a user interaction with the replication tool or application associated therewith. A user may interact with a keyboard, mouse, and/or touch screen to implement various functionalities to design a repeatable object set. The design application may generally have drawing tools that can be used to facilitate drawing aspects or including images or text as part of the repeatable object set. For example, text formatting, drawing tools, text input, style tools, menus, or the like can be used to generate a repeatable object set. Field formats can also be designated in a similar manner. For example, a field format may be selected via options such as drop down menus to select desired field formats. In other cases, field formats can be designated by a user via user interaction and manipulation of the location of an object or set of objects within a field. For example, a user may utilize a selector or mouse to move an object to a desired location within a field. In some cases, a location of an object may be designated in relation to a reference point, such as the upper left-hand corner of a field. The location can be designated based on user input of a distance from the reference point or determined based on user movement/placement of the object relative to the reference point associated with a field.

Figure 2:
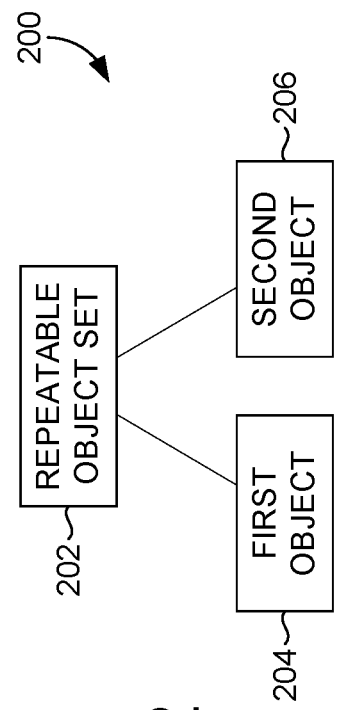
FIG. 2 illustrates an exemplary hierarchical model representing a repeatable object set, in accordance with embodiments of the present invention.

In accordance with the input provided by the user regarding an object set and layout associated therewith, a repeatable object set can be represented via a data model. In some cases, a model representing a repeatable object set can be a hierarchical structure or tree of objects. FIG. 2 illustrates an exemplary hierarchical model 200 representing a repeatable object set. As illustrated, the hierarchical model 200 includes a repeatable object set node 202 with children nodes 204 and 206. Child node 204 represents a first object, such as an icon, and child node 206 represents a second object, such as a title. In some cases, the repeatable object set node 202 can include details or properties describing the repeatable object set that generally describes or characterizes the repeatable object set. In this case, the properties associated with the repeatable object set node generally apply to the various object sets unless a property is overridden as indicated in a descendant node.

In addition to a repeatable object set node 202 indicating an object(s) within a repeatable object set, such as an icon and a title, and object formatting associated therewith, the field format and/or layout structure format can also be defined in association with the repeatable object set node 202. For example, attributes or properties designated in association with the repeatable object set node 202 may include an icon object (size, color); a text object (text size, text color); a field format (placement of icon object, placement of text object); and a layout structure format (number of rows, number of columns, size of rows, size of columns, horizontal padding/spacing, vertical padding/spacing).

Each child or descendant node can contain or store a set of overridden values for given properties within the repeatable object set. For example, assume that the text object is generally designated as "ABC," but the text object in the first field is modified by the user or designated to "XYZ". In such a case, the content for the text object in the first field can be overridden in association with object node 206. As can be appreciated, this is only an example, and the inventors contemplate various possible implementations. For instance, properties could be stored in a separate data model that represents a particular instance of the object set.

In some cases, a model representing a repeatable object set might be generated as the user provides input regarding the object(s), field format, and/or layout structure format. In other cases, a model representing repeatable object set might be generated upon a user indication of completion of the repeatable object set. Although a repeatable object set node described herein generally includes the field format and layout structure format, other embodiments may be employed. For example, a repeatable object set node may simply be the objects for inclusion within a field without any particular reference to layout of the objects. In such a case, the field format aspect may be separate but corresponding with the repeatable object set. Similarly, a repeatable object set node may exclude properties related to layout structure format, such as number and size of columns, number and size of rows, and/or spacing therebetween. In such a case, the layout structure format may be separate but corresponding with the repeatable object set.

The object set replicator 108 is configured to replicate the repeatable object set. In this regard, the object set replicator 108 can replicate a repeatable object set into various fields within a layout structure. In some cases, replication might be triggered via selection of a replication tool, for example, in accordance with or upon generation of a repeatable object set. For example, upon generating a repeatable object set, a user might select a "replicate" icon or setting to initiate the replication. Accordingly, the object set replicator 108 might detect an indication to apply a replication and, in response thereto, enable replication of a repeatable object set.

In cases in which field format and/or layout structure format have not been already been provided or included with the repeatable object set, a user interface prompting the user to include such details might be provided. For example, upon selecting to replicate a repeatable object set, the user may be prompted to provide attributes for formatting the layout structure. Such attributes may include a number of rows, a number of columns, a size of rows, a size of columns, a horizontal spacing, a vertical spacing, border line width, or the like. A user might provide such details in any manner. For instance, in some cases, a user might select, e.g., via a menu, a number or size of fields, etc. Additionally or alternatively, a user may manipulate the fields to provide such input. For instance, a user may use a selector to drag a field border to a desired size. As another example, upon a user dragging out a border(s) of a layout structure, a number of rows/columns can be determined. A default spacing can initially be provided and, thereafter, modified via user interactive manipulations with borders between rows/columns.

In accordance with an indication to replicate a repeatable object set, the repeatable object set is replicated into one or more fields within a layout structure. In some cases, the repeatable object set might be replicated into all fields within the layout structure. In other cases, the repeatable object set might be replicated into a portion of the fields within the layout structure. For instance, a repeatable object set might only be replicated into fields within a particular column of the layout structure. As can be appreciated, some implementations might enable a user to designate which fields or set of fields in which to replicate the repeatable object set. For example, a user might indicate a row(s) and/or column(s), via a menu or selection of fields within the layout structure, to designate fields in which to replicate the repeatable object set. In other cases, the repeatable object set might be replicated into all fields within the layout structure. By way of example, and without limitation, assume that a user selects an icon to replicate a repeatable object set. In such a case, the user may be prompted to designate or design an initial layout structure including a number of rows and columns of fields to include in the layout structure. Upon selecting x rows, and y columns, the layout structure may be generated with x rows and y columns along with the repeatable object set replicated in each field in the layout structure.

In rendering the content, the replicator might first render the initial instance of the repeatable object set and then copy the initial instance into the appropriate fields. For example, when the application renders the content, it first renders the initial instance of the repeated content, then renders copies of those instances that are translated horizontally/vertically, or in some pattern, by the cell size, up to the outer bounds set by the user. In other embodiments, the replication may occur within the model layer rather than the rendering layer.

A modification manager 110 is generally configured to manage modifications in association with an object set and/or layout structure. In embodiments, upon initial replication of a repeatable object set, the modification manager 110 can be configured to facilitate modification of an object set(s), including field format, and/or layout structure format. As previously described, enabling modification of an object set(s) and/or layout structure format in accordance with embodiments described herein allows efficient modifications to be made to a visual design and thereby enables a user to quickly view the changes, for example, to determine if such a modification is desired to be made. For example, a user may wish to view how a change to an object might appear within a user interface design. For instance, a user may wish to interact with an object in real time (and not just after an interaction gesture is completed) such that the user can visualize the impact on other object sets being resized or modified or the effect of the layout in real time in accordance with a modification (e.g., resizing) of one object or object set. As another example, a user may wish to view how a change to the layout structure might appear within a user interface design.

As described, a user may wish to modify an aspect(s) associated with a repeatable object set. Such a modification may be directed to the objects, such as the object format (e.g., color, size), object content, object container, object type, object style, object layout or position, etc. Accordingly, a user may select or provide input to modify an object or field format associated therewith. Such selections/input may be performed in any manner. For instance, a user may modify a style, color, or other format of the object by right clicking or otherwise selecting an object and selecting a new style or format to apply to the object. In other cases, a drag and drop functionality may be employed to provide a new format or content to an object.

In accordance with embodiments described herein, modifications made to an object and/or a field format may be applied globally or locally. In a global modification application, a modification made to one object set, or portion thereof, can be applied to the other replicated object sets. To effectuate such a global application, some embodiments may designate that the initial repeatable object set is to be modified to reflect the modification in the other replicated object sets. In other embodiments, any object set modified can result in modification to the other object sets.

In a local modification application, a modification made to an object set applies only to that object set such that additional object sets are not modified in the same manner. For example, a user may modify the text/label of one object set without desiring to cause the modification to be made in association with any other object sets. As can be appreciated, in some cases, a designation of particular object sets to receive a modification may be designated (i.e., semi-global modification). For example, a user may select to generate a modification in accordance with each object set in the top row of a layout structure but not object sets replicated in the subsequent rows in the layout structure.

The designation of a global, local, or semi-global modification to be applied can be designated in any number of ways and is not intended to limit the scope of embodiments described herein. For example, in some cases, when an initial repeatable object set is modified, the entirety of object sets are modified. On the other hand, when a replicated repeatable object set is modified, only that particular repeatable object set is modified. As another example, a user may select any number of object sets for which to apply a modification. As yet another example, different selections of an object set used to make the modification may trigger varied modification implementations. For instance, upon highlighting an object set and making a modification, a global modification may be applied. In contrast, upon right clicking an object set and making a modification, a local modification may be applied. As yet another example, when a style or layout modification is detected, a global modification is applied, and when a content modification is detected, a local modification is applied. Any number of methods for initiating modifications and/or designating a modification type, such as local or global, can be envisioned and employed.

In operation, a modification can be effectuated in any manner. In some embodiments, a modification can result in an overridden property value applied to each individual instance as necessary. For example, with reference to FIG. 2, assume that a user makes a global change to an icon. In such a case, a property of the repeatable object node 204 can be modified to reflect the global change to the icon. As another example, and with continued reference to FIG. 2, assume that a user selects to modify the icon associated with an object set within a first field (i.e., a local modification). In such a case, a property included within child node 206 representing a first object (e.g., an icon) can override a previous property assigned to the particular node and/or the globally applied property value. In embodiments in which the replication occurs within a model layer rather than in a rendering layer, it can be appreciated that global edits can be replicated across all copies in the model layer.

In embodiments, in accordance with edits by a user, the modification manager 110 can determine whether to apply the modification as a global, semi-global, or local modification. For example, upon a user double-clicking on an object within an object set, the modification manager 110 can detect which object set was selected and apply the modification locally or globally.

As previously described, examples of modifications made in connection with an object set may include modifications associated with an object (e.g., format, content, style), field format (e.g., spacing of objects within a field), etc. For instance, a user may modify the location or position of a particular object within a field and, in response, the corresponding object in other fields can be modified in accordance therewith. To modify content associated with an object, any number or manner of approaches may be used. One approach includes selecting content, for example, from storage, and dragging or otherwise providing an indication to include the content in association with an object. For instance, a user may select a set of icons and drag the icons into the layout structure, or particular object/object set therein, to indicate a content selection. Based on the content selection, the selected content can be added as content to the various object sets. By way of example only, assume that a user selected two icons to drag to the layout structure. Further assume that 20 fields having object sets with an object container are included in the layout structure. In such a case, the object containers can be filled with the selected content. This could be in a repeated pattern or any other pattern. With a repeated pattern, a first object container in a first object set could include a first selected icon, a second object container in a second object set could include a second selected icon, a third object container in a third object set could include the first selected icon, and so on until each of the object containers within the 20 fields are alternately filled with the selected two icons.

Modifications to the layout structure may also be applied globally, semi-globally, or locally applied. For example, assume that a user selects to increase the number of columns and/or rows of fields within a layout structure. Such a modification can be performed in any manner. For instance, a user may input or select a number of columns and/or rows. In another example, a user may select a handle or part of the layout structure to manipulate the size of the layout structure. As a border of a layout structure is manipulated to expand the layout structure, additional fields (e.g., via columns or rows) can be added and filled with a designated repeatable object set. Another example of modifying a layout structure includes a user manipulation of the padding or spacing between fields. For instance, assume that a user expands the spacing between a first column of fields and a second column of fields. In some cases, the spacing between each set of adjacent columns may be manipulated in the same manner. In other cases, the modification can be locally applied such that only the spacing between the first and second columns is adjusted. As can be appreciated, the data represented in the model can also be modified to reflect the modified layout structure.

Various modifications described herein can be initiated in any manner and are not intended to be limited to the examples provided herein. Although the modification manager 110 is described as a separate component from the repeatable object set generator 106 and object set replicator 108, as can be appreciated, the modification functionality described herein can be implemented in other manners, such as part of the repeatable object set generator and/or object set replicator component functionality.

As can be appreciated, object sets and modifications thereto, can be provided or presented for display on a computing device. In this regard, upon replicating and/or modifying object set(s), the replicated and/or modified object set(s) can be presented for display at a computing device, for example, via display screen 102.

Turning now to FIGS. 3-9, FIGS. 3-9 provide user interfaces for generating and modifying object sets, in accordance with embodiments of the present invention. A user may interact with the user interfaces provided in FIGS. 3-9 in any manner, such as a touch interaction or utilization of a mouse or keyboard, or the like.

Figure 3:
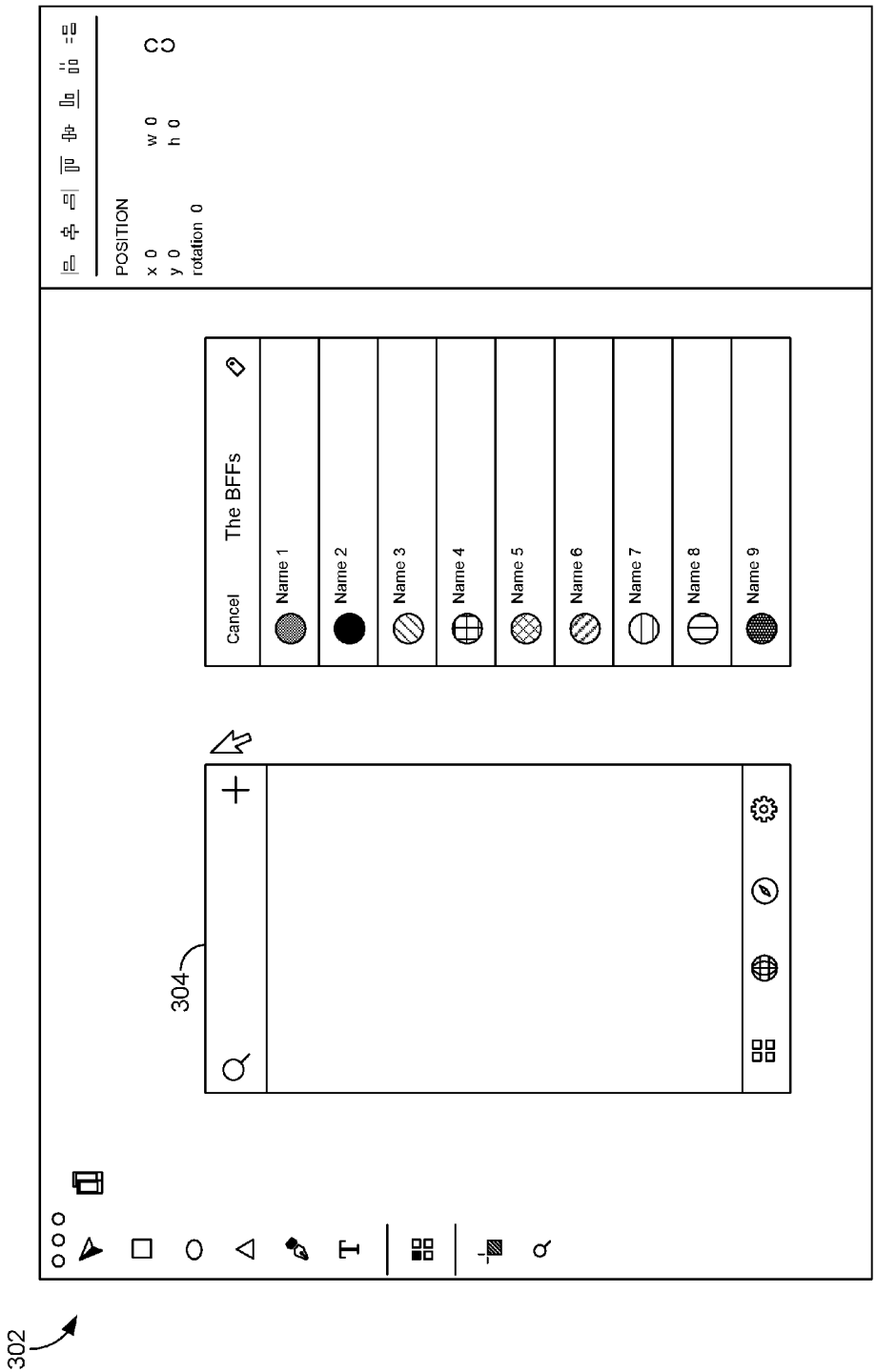
FIG. 3 illustrates an exemplary visual screen design application.
Figure 4:
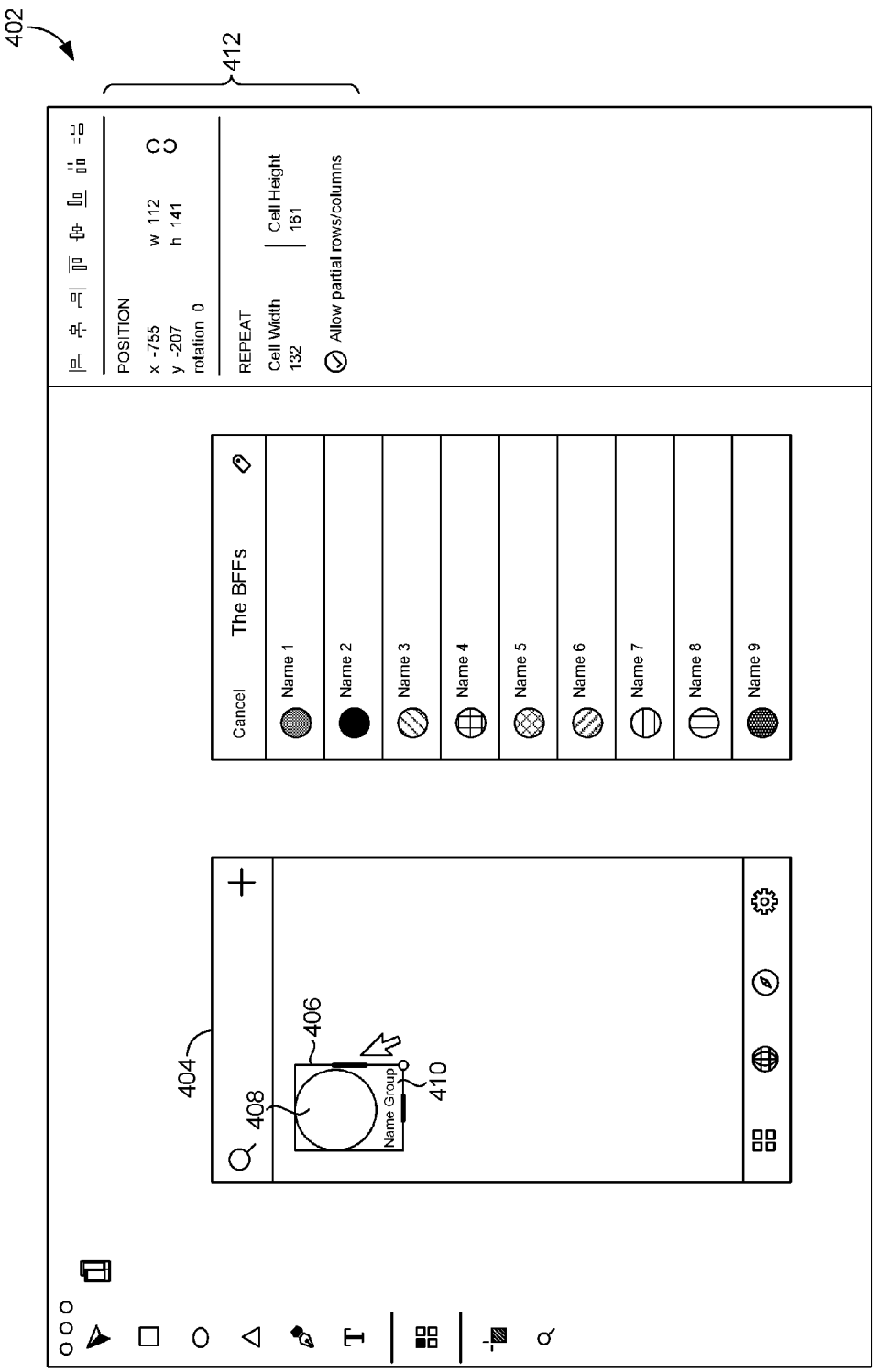
FIG. 4 illustrates a repeatable object set, in accordance with embodiments of the present invention.

Initially, with respect to FIG. 3, FIG. 3 illustrates an exemplary visual screen design application 302. Assume a user selects to generate a new visual user interface for including in a mobile application. In such a case, the user may be presented with a user interface screen 304. As illustrated in FIG. 4, the user can initiate a repeatable object set 406 for inclusion with the user interface screen 404. One method for initiating a repeatable object set is to select the items originally individually drawn as items 408 and 410 and then selecting a repeat icon. As illustrated in FIG. 4, the repeatable object set 406 includes an icon object container 408 and a text object container 410. Object set data 412 is presented within the visual screen design application 402 to provide the user with data associated with the repeatable object set and/or layout structure. The data provided as object set data 412 is only exemplary in nature and not intended to limit the scope of embodiments described herein.

Figure 5:
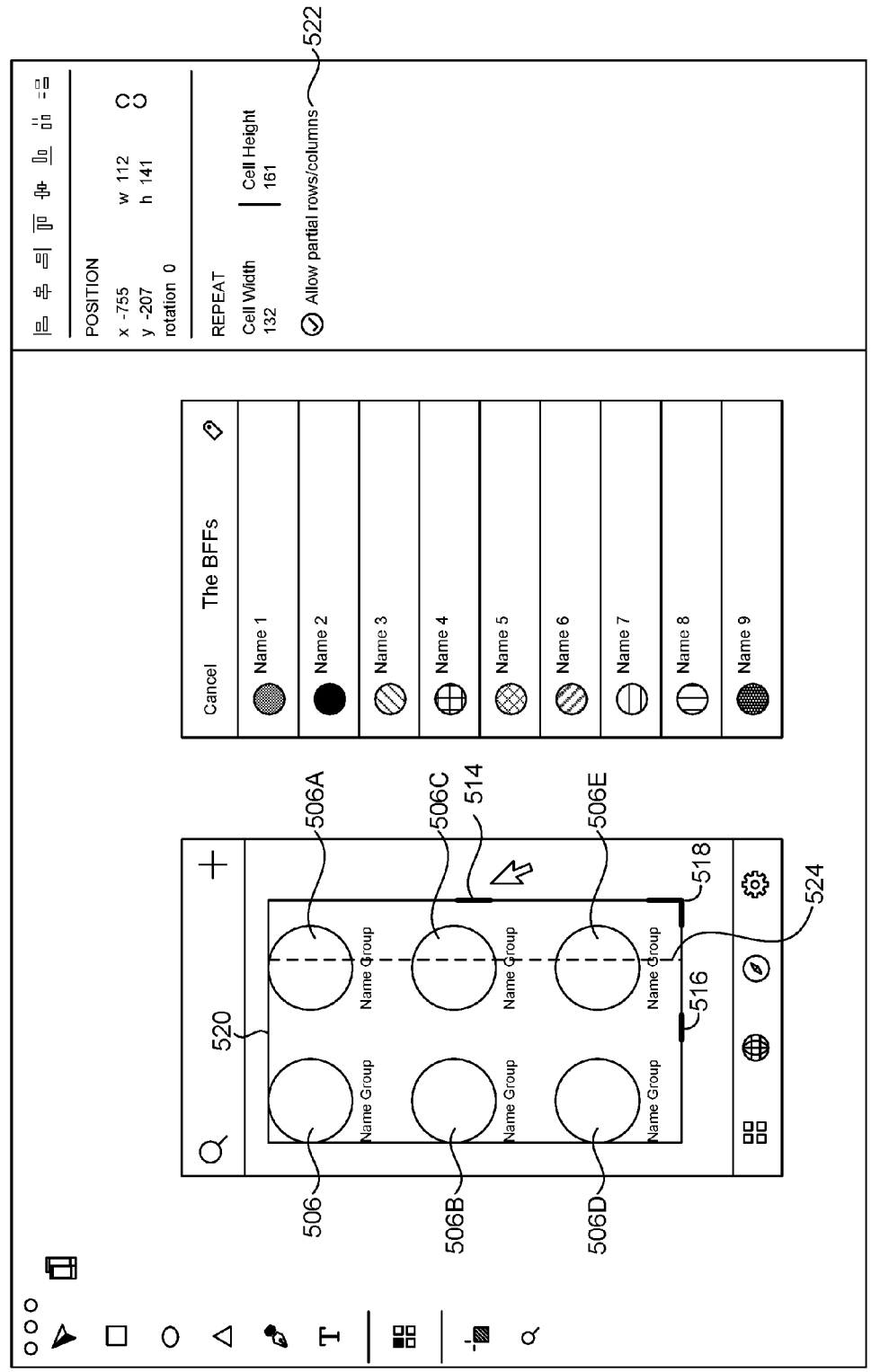
FIG. 5 illustrated replicated object sets, in accordance with embodiments of the present invention.

With respect to FIG. 5, assume that a user selects handle 514, 516, and/or 518 to expand the layout structure 520. In accordance with increasing the size of the layout structure 520, the initial repeatable object set 506 is replicated to fill the additional fields created within the layout structure 520. The replicated object sets are indicated as 506A-506E in FIG. 5. As illustrated, partial fields can be indicated as desired or not desired via option 522. In this regard, a user can select whether he or she desires partial fields to be enabled as the layout structure is modified. When allow partial column/row is not selected, an extra column and/or row may not be created until the handle(s) surpasses the size of the column/row. In this regard, assume that handle 514 is only dragged to position 524. In such a case, the extra column would not be created until the handle 514 is moved beyond that column. On the other hand, when allow partial column/row is selected, a column and/or row, or portion thereof, can be created as the handle is moved. In such a case, a partial column/row with partial object sets may be presented when a handle is at a mid-point within a column/row.

Figure 6:
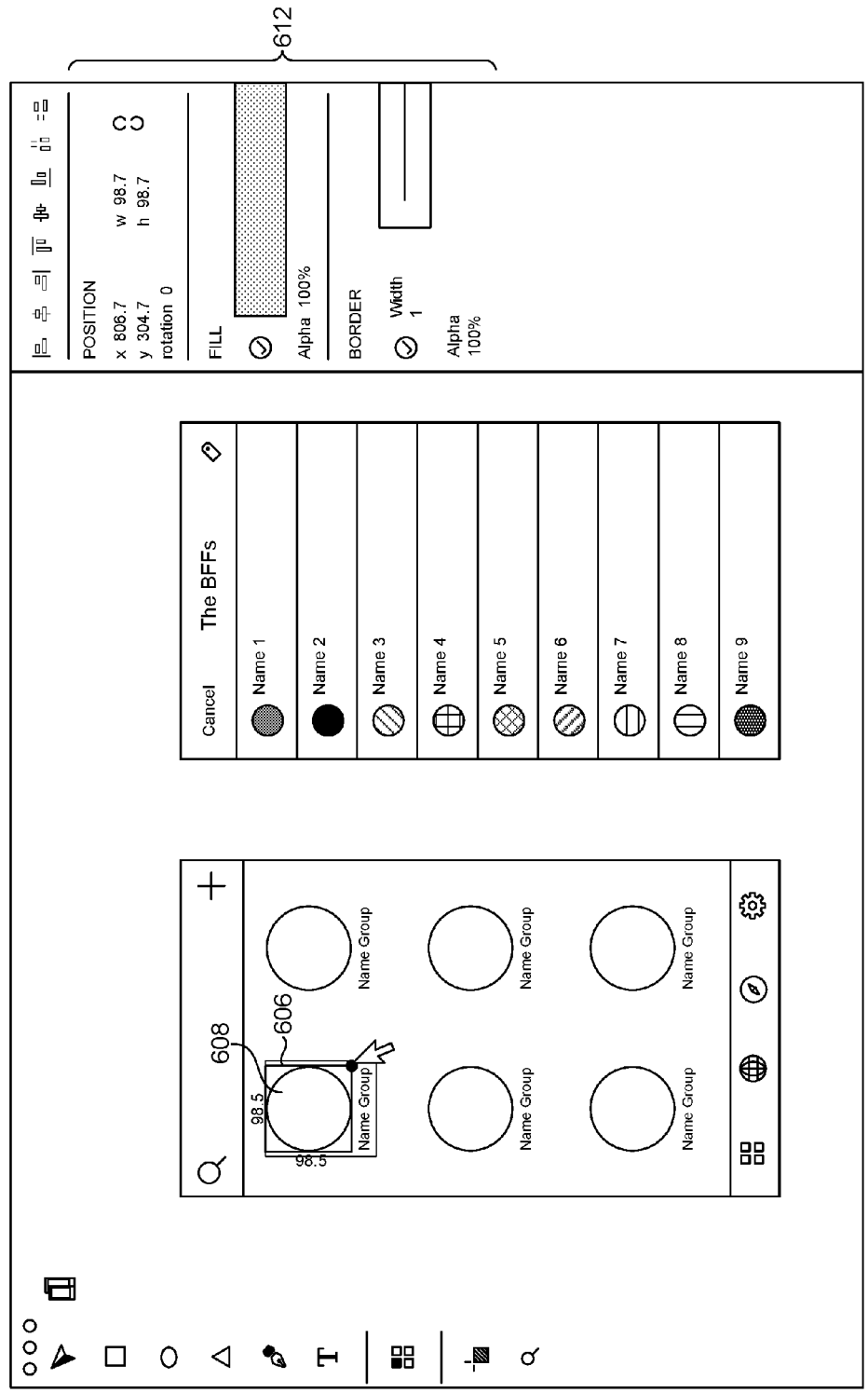
FIG. 6 illustrates an exemplary user interface for modifying an object within an object set, in accordance with embodiments of the present invention.
Figure 7:
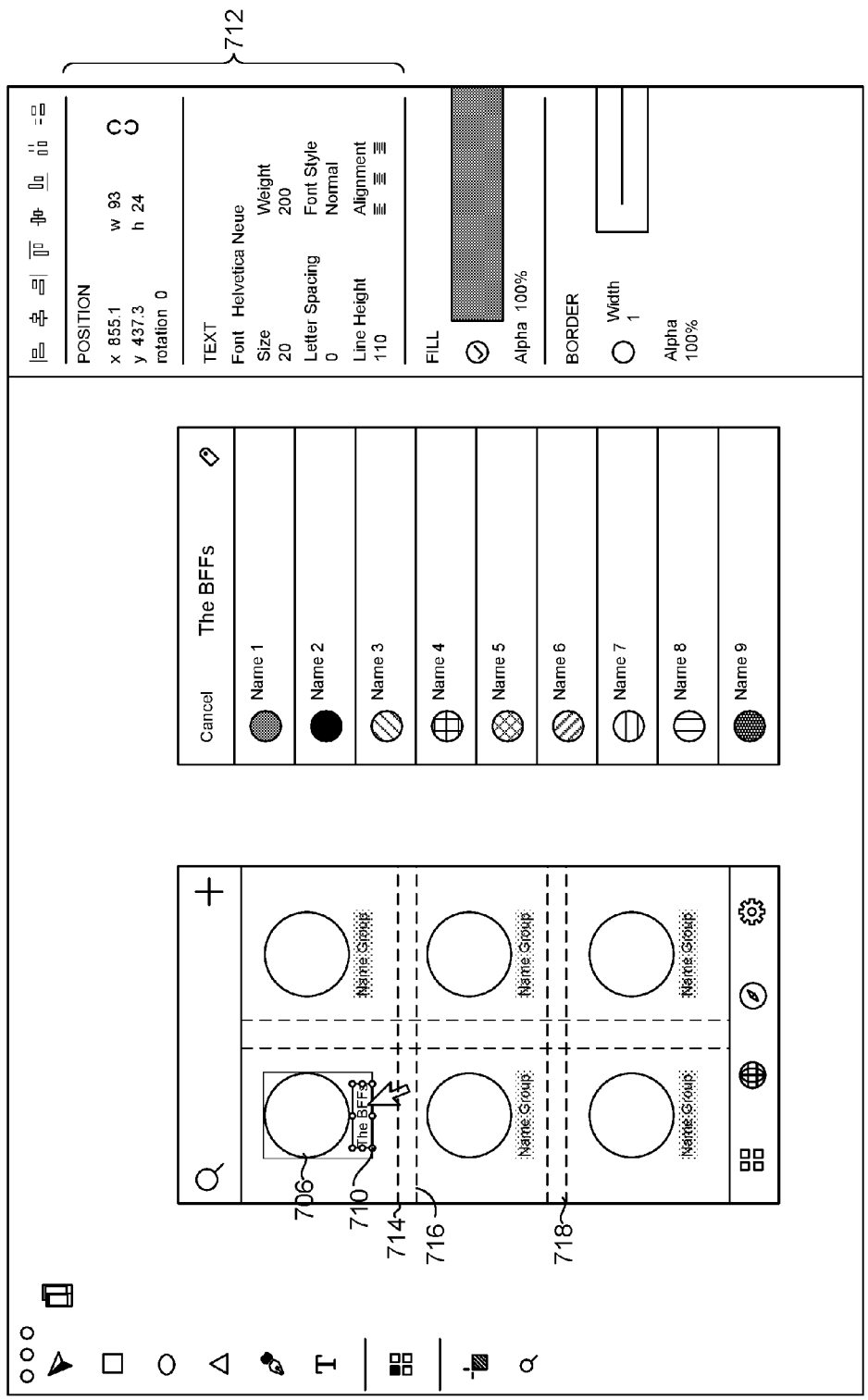
FIG. 7 illustrates another exemplary user interface for modifying an object within an object set, in accordance with embodiments of the present invention.

With reference to FIG. 6, FIG. 6 illustrates an exemplary user interface for modifying an object within an object set. As shown, a user can select the object set 606 and manipulate the icon object container 608 by modifying the size and/or position of the icon object 608. In some cases, other instances of the same item in other object sets can be highlighted to indicate to the user the other items that might be affected by an edit. As can be appreciated, depending on an implementation, such a modification may be applied locally to that specific object set or globally to each of the presented object sets. Further, in this case, object set data 612 is related to the object set 606. Similarly, and as illustrated in FIG. 7, a user can select the object set 706 and manipulate the text object container 710, herein modified to the "The BFFs." As shown in FIG. 7, the modification to the text object 710 was applied locally and the other text objects were not modified. As illustrated, object set data 712 is related to object set 710.

With continued reference to FIG. 7, FIG. 7 also illustrates an example implementation for modifying aspects of the layout structure. In particular, assume that a user uses the selector to select the spacing 714 between a first row and a second row. In such a case, as the user drags or moves spacing boundary 716, the spacing 718 between the second row and a third row automatically adjusts in accordance with the spacing width applied to the spacing 714. Increasing or decreasing the spacing between rows and/or columns can occur in any manner, and utilization of a selection is only one example. In some cases, if a spacing boundary is dragged, the spacing is increased by a smaller amount proportion to which column/row being dragged. In contrast, if the spacing is increased by one pixel for every mouse movement to adjust spacing, because the spacing is being added to every column, the current column would move to the right more quickly than expected.

Figure 8:
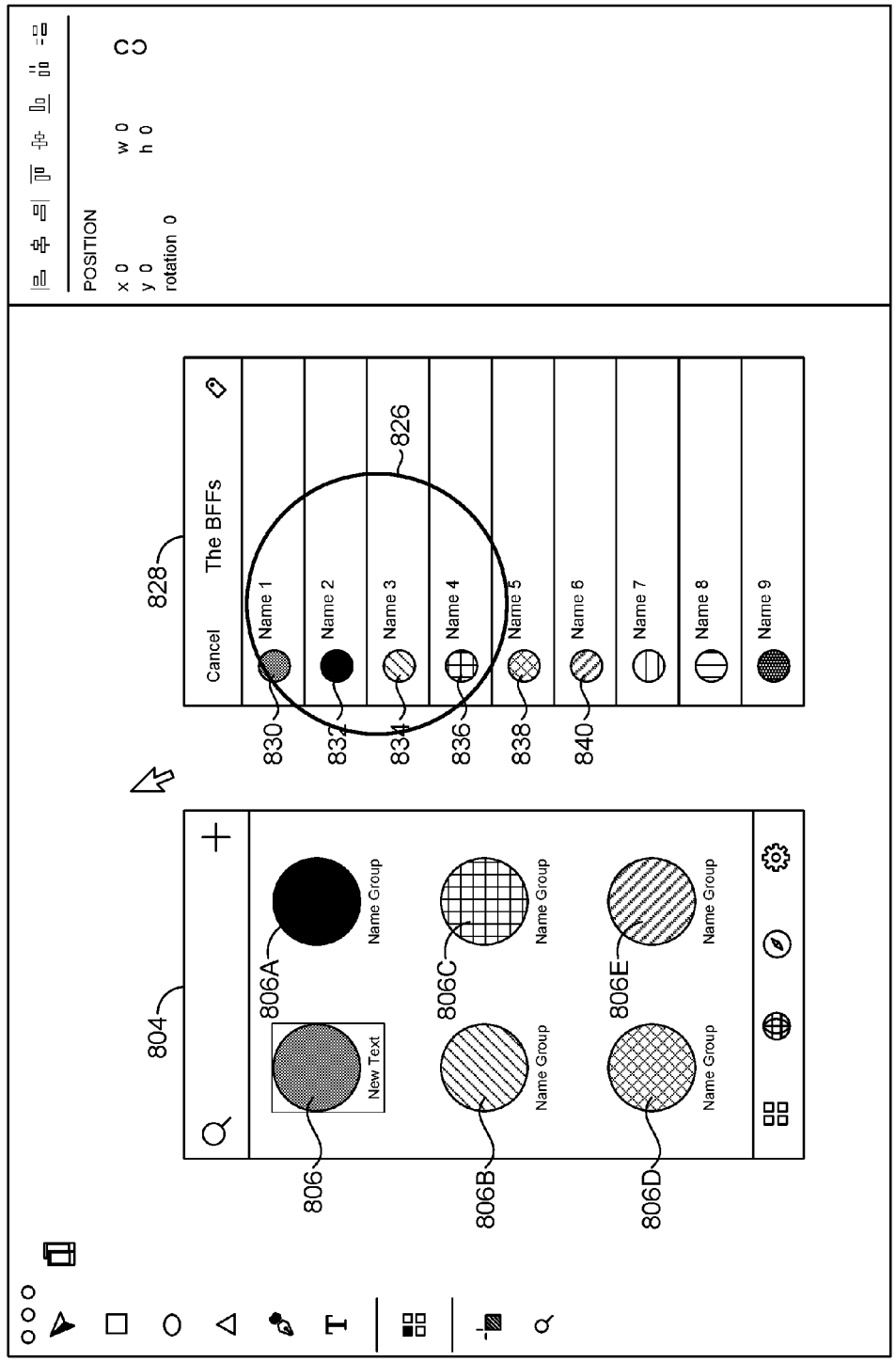
FIG. 8 illustrates an exemplary user interface for providing content for incorporating content into various object sets, according to various embodiments of the present invention.
Figure 9:
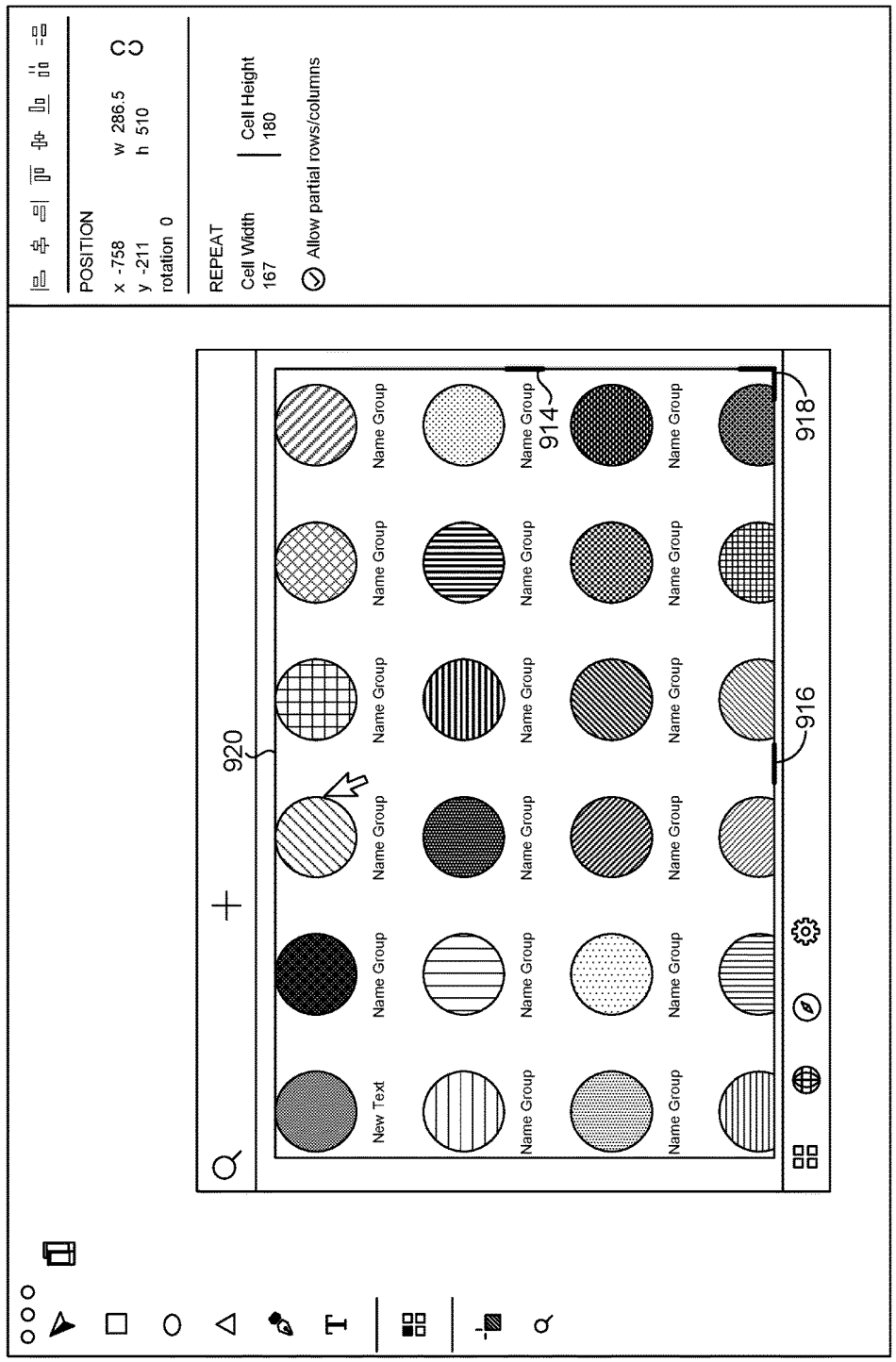
FIG. 9 illustrates a user interface for modifying a layout structure, according to one embodiment of the present invention.

FIG. 8 illustrates a user interface for providing content for object containers included in various object sets of a layout structure. For example, assume that a user selects the icon content 826 provided from another source 828 (e.g., images in a file system). Further assume that the user drags and drops (or otherwise selects) the content into user interface screen 804. In such a case, content 830 fills object 806, content 832 fills object container 806A, content 834 fills object container 806B, content 836 fills object container 806C, content 838 fills object container 806D, and content 840 fills object container 806E. In this regard, a user is not required to move each content item independently to an appropriate object container. Rather, a set of content items can be selected and used to automatically fill a plurality of objects containers. Continuing with reference to FIG. 9, assume the user drags the handles 914, 916, and/or 918 to expand the layout structure 920. In such a case, upon expanding the layout structure beyond each additional row and column, the set of previously selected content items, as illustrated in FIG. 8, are used to automatically fill the replicated objects in the additional rows/columns, as shown in FIG. 9.

Figures 10, 11:
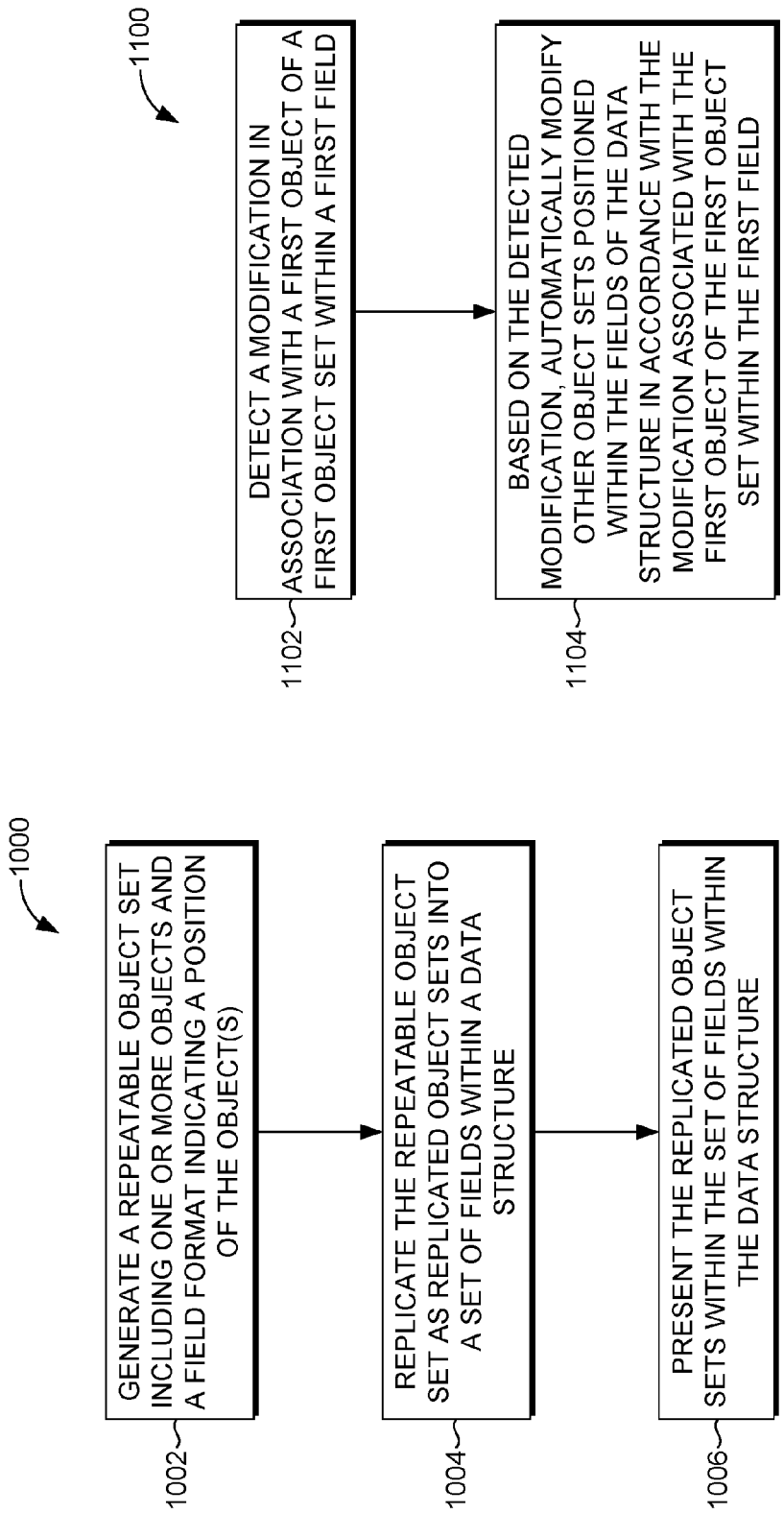
FIG. 10 is a flow diagram showing a method for replicating a repeatable object set according to one embodiment of the present invention.
FIG. 11 is a flow diagram showing a method for modifying object sets in accordance with a modification to an object set, according to one embodiment of the present invention.

Turning now to FIG. 10, a flow diagram is provided that illustrates a method 1000 for facilitating replication of object sets, in accordance with embodiments of the present invention. Initially, as shown at block 1002, a repeatable object set including one or more objects and a field format indicating a position of the object(s) is generated. In embodiments, the repeatable object set is generated, at least in part, based on input provided by a user. Such input may be directed to the objects and/or field format. At block 1004, the repeatable object set is replicated as replicated object sets into a set of fields within a layout structure. Each of the replicated object sets includes a representation of the object(s) placed within a corresponding field in accordance with the field format indicating the position of the object(s). In embodiments, the replication may occur, for instance, in the model layer or the rendering layer. At block 1006, the replicated object sets within the set of fields of the layout structure are presented. The replicated object sets can be related or linked to one another such that a modification to one object set, such as an object or field format, can be automatically applied to other object sets.

Turning now to FIG. 11, a flow diagram is provided that illustrates a method 1100 for modifying object sets in accordance with a modification to an object set, according to embodiments provided herein. Initially, at block 1102, a modification in association with a first object of a first object set within a first field is detected. The first object set can be one of a plurality of object sets positioned within various fields of a layout structure. As can be appreciated, such a modification may be a modification to an object format, an object content, an object position within a field, or the like. At block 1104, based on the detected modification, other object sets positioned within the fields of the layout structure are automatically (e.g., without user intervention) modified in accordance with the modification associated with the first object of the first object set within the first field. In some cases, it is determined or detected as to whether the modification is a layout modification, a style modification, or a content modification (or a particular type of modification). If it is determined to be a layout modification or a style modification, the modification is automatically applied globally to other object sets positioned within fields of the layout structure. On the other hand, if it is determined to be a content modification, the modification is applied only locally to the modified object set. In this regard, intelligent defaults about which edits should be replicated can be applied and implementations may vary based on various types of modifications. In embodiments, a user may be provided with an option to override these defaults.

Figure 12:
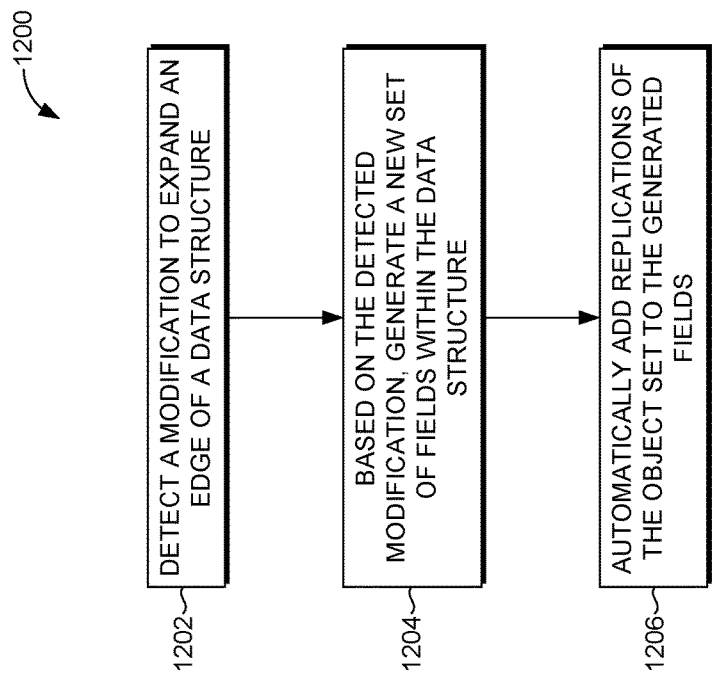
FIG. 12 is a flow diagram showing a method for performing modifications based on a modification to a layout structure, according to one embodiment of the present invention.

With reference now to FIG. 12, a flow diagram is provided that illustrates a method 1200 for performing modifications based on a modification to a layout structure, according to embodiments provided herein. Initially, as indicated at block 1202, a modification to expand an edge of a layout structure is detected. In embodiments, the layout structure contains a plurality of fields, wherein each of the fields contains an object set having one or more objects. As an example, the modification may be dragging a border of the layout structure to expand the size of the layout structure to include a new column of data fields. At block 1204, based on the detected modification, a new set of fields is generated within the layout structure. The new set of fields might be a column(s) of fields, a row(s) of fields, or a combination thereof. At block 1206, replications of the object set are automatically (i.e., without user intervention) added to the generated fields. In this regard, a user can expand the size of the layout structure and automatically incorporate additional rows and/or columns filled with a replicated object set.

Having described an overview of embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, layout structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output (I/O) ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, layout structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, layout structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer-storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc. The I/O components 1320 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

As can be understood, embodiments of the present invention provide for, among other things, facilitating replication and/or modification of object sets. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-usable instructions that, when used by one or more computing devices, cause the one or more computing devices to facilitate object set replication, comprising:
    launching an application for building a graphical user interface (GUI);
    generating a layout structure in the application that visually presents a structure of the GUI to be built in the application, the layout structure including a boundary corresponding with a perimeter of the layout structure and fields within the boundary;
    detecting a modification to the boundary corresponding with the perimeter of the layout structure in the application;
    modifying the layout structure by expanding the boundary corresponding to the perimeter of the layout structure and adding additional fields to the layout structure in response to detecting the modification to the boundary, wherein modification to the boundary results in changes to the structure of the GUI being built in the application; and
    when a plurality of fields each include a repeatable object set having an object:
        detecting a modification to the object in one of the repeatable object sets; and
        modifying objects in the repeatable object sets in response to detecting the modification to the object, wherein modification to the repeatable object sets in the plurality of fields results in changes to objects in the GUI being built in the application.

2. The media of claim 1 further comprising receiving a selection to replicate the repeatable object set.

3. A computer-implemented method to facilitate object set replication, the method comprising:
    launching an application for building a graphical user interface (GUI);
    generating a layout structure in the application that visually presents a structure of the GUI to be built in the application, the layout structure including fields and spacing boundaries located between the fields, the spacing boundaries visually indicating a distance between the fields;
    receiving an indication to modify a location of one of the spacing boundaries located between fields in the layout structure;
    modifying the spacing boundaries located between the fields in response to receiving the indication to modify the location of the one of the spacing boundaries, wherein modifying the spacing boundaries changes the distance between the fields in the structure of the GUI being built in the application; and
    when a plurality of the fields each include a repeatable object set having an object:
        receiving an indication to modify the object in one of the repeatable object sets; and modifying objects in the repeatable object sets in response to receiving the indication to modify the at least one object, wherein modification to the repeatable object sets in the fields results in changes to objects in the GUI being built in the application.

4. The method of claim 3, wherein the object comprises text, an image, a media, or a container.

5. The method of claim 3, wherein the repeatable object set is represented via a model of nodes.

6. The method of claim 3, wherein the repeatable object set includes a field format, the field format indicating a layout of the object within the field of the repeatable object set.

7. The method of claim 3, wherein the indication to modify the spacing boundary comprises an amount of space.

8. One or more computer storage media storing computer-usable instructions that, when used by one or more computing devices, cause the one or more computing devices to facilitate object set replication, comprising:

launching an application for building a graphical user interface (GUI);

generating a layout structure in the application that visually presents a structure of the GUI to be built in the application, the layout structure including fields, each of the fields having an object container;

receiving a selection of a category of content, the category controlling the content to be placed within each of the object containers; and automatically placing content of the selected category of content within each of the object containers in response to the selection received, wherein the content automatically placed within each of the object containers is inserted into the structure of the GUI being built in the application.

9. The media of claim 8 further comprising receiving an indication of the object containers to which the selected type of content is to be placed.

10. The media of claim 8, wherein each object container is designated to hold the particular type of content.

11. The media of claim 8, wherein the object containers are filled with the selected type of content in a repeated pattern.

* * * * *